United States Patent [19]

Sweet et al.

[11] 4,386,749
[45] Jun. 7, 1983

[54] PROPELLER DEICER

[75] Inventors: David B. Sweet, Akron, Ohio; Wayne E. Hoffman, Richwood, W. Va.

[73] Assignee: The B. F. Goodrich Company, New York, N.Y.

[21] Appl. No.: 914,636

[22] Filed: Jun. 12, 1978

Related U.S. Application Data

[63] Continuation-in-part of Ser. No. 774,576, Mar. 4, 1977, abandoned.

[51] Int. Cl.³ .............................................. B64D 15/12
[52] U.S. Cl. ................................................. 244/134 D
[58] Field of Search ...................... 244/134 R, 134 D; 219/201, 202, 528, 537, 549, 552, 553

[56] References Cited

U.S. PATENT DOCUMENTS

| 2,494,625 | 1/1950 | Martin | 244/134 D |
| 2,552,075 | 5/1951 | Van Daam | 244/134 D |
| 2,599,059 | 6/1952 | Jones | 244/134 D |
| 2,757,273 | 7/1956 | Taylor | 244/134 D X |
| 3,657,514 | 4/1972 | Adams | 244/134 D X |

Primary Examiner—Charles E. Frankfort
Attorney, Agent, or Firm—Joseph Januszkiewicz

[57] ABSTRACT

A deicer for use on the propeller of an aircraft wherein the heating elements or elements of the deicer which are embedded in an electrically non-conductive material adhered to a propeller blade provide a gradient type of heat distribution pattern having the greatest heat concentration at the area of the propeller closer to the shank end and a lower heat concentration at the area of the propeller further away from the shank end.

16 Claims, 7 Drawing Figures

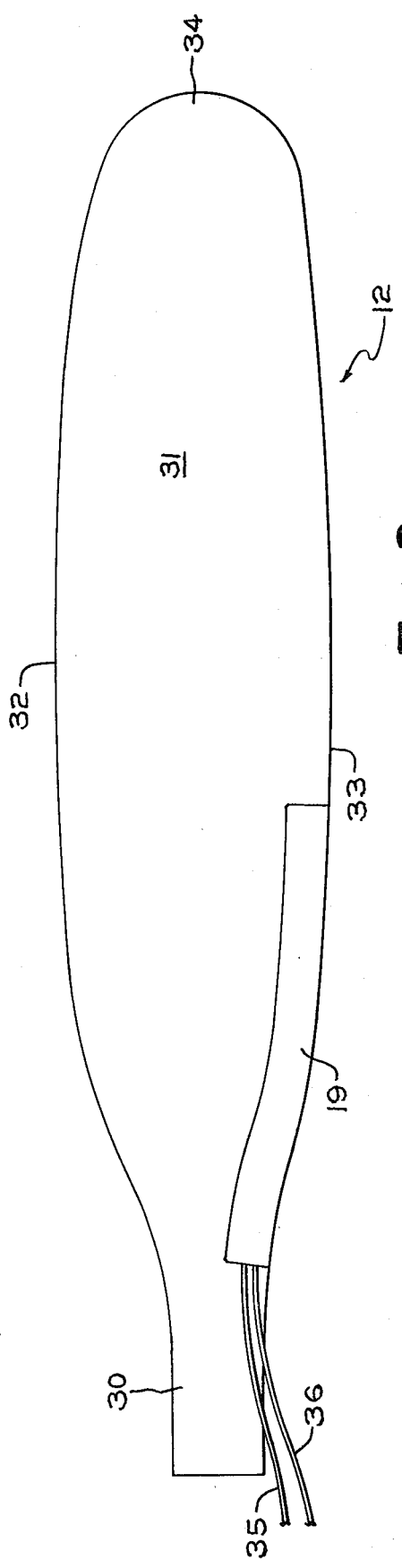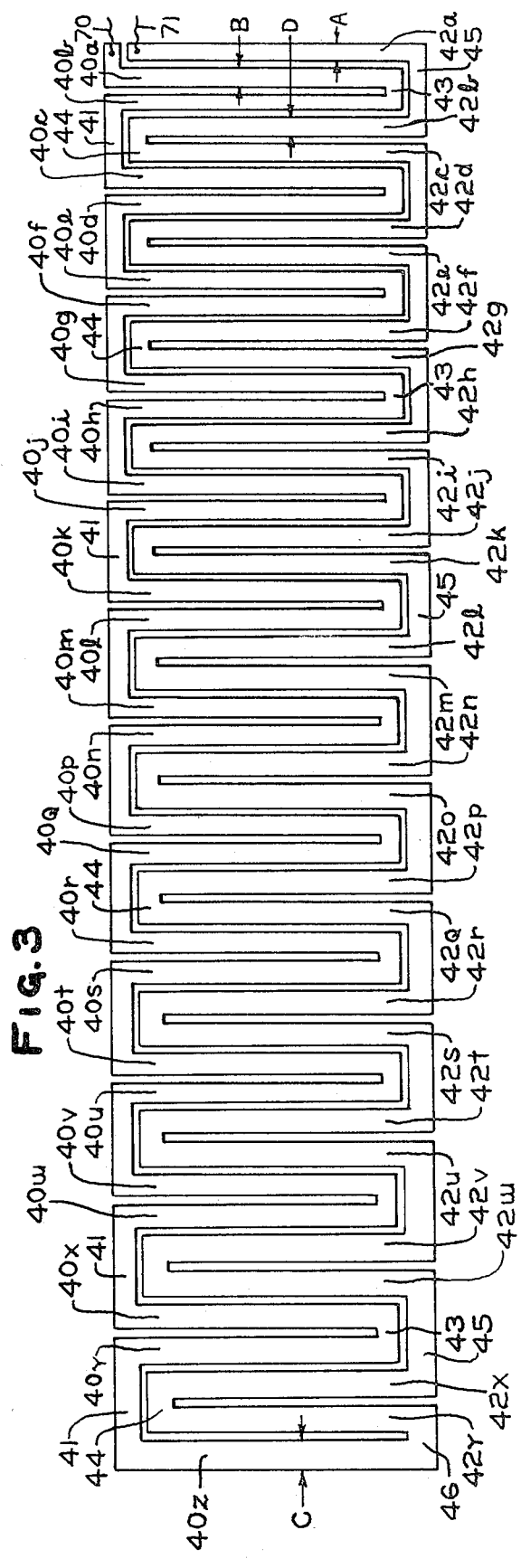

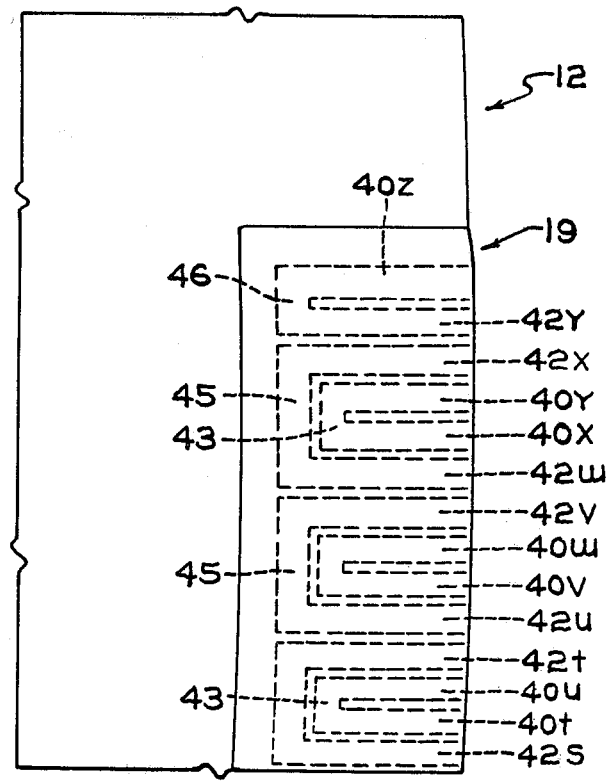
FIG.6
FIG.7
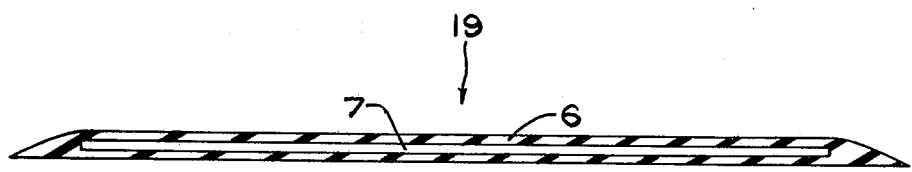

PROPELLER DEICER

CROSS REFERENCE TO RELATED APPLICATION

This application is a continuation-in-part of our co-pending application Ser. No. 774,576 filed Mar. 4, 1977 now abandoned.

BACKGROUND OF THE INVENTION

This invention relates to aircraft propeller deicing systems and more particularly to a propeller deicer which is bonded to the propeller blade and has electricity supplied to the deicer for conversion to heat to remove ice that is formed on the blades.

Various deicer heating means have been tried on propeller blades to remove the ice on the propeller blades wherein heat was supplied periodically to conserve the power supply on such aircraft. The deicer heating devices employed intricately wound resistance wires which were attached to or molded into flexible rubber sheets or pads for attachment to the leading edges of the propeller blades. The life of such heaters were limited by abrasion. The deicer pad would become questionable for use if there were punctures of the pad since the serviceability would depend on the integrity of the intricately wound wire strands. The present invention provides a deicer pad that is considerably more durable and serviceable from the standpoint of abrasion and puncture resistant. In addition the present invention provides a deicer pad that provides a gradient type of heat distribution onto the propeller blade which more efficiently and effectively removes the ice that is formed on the blades.

SUMMARY OF THE INVENTION

The present invention contemplates a deicer for mounting on the leading edge of a propeller blade, wherein the heating element within the deicer provides a continuous zig-zag path from the inboard end of the deicer that is closely adjacent to the shank end of the propeller to the outboard end or tip of the deicer with the heating element having a gradient power density extending from the inboard end to the outboard end and with the greatest power density being at the inboard end. Such gradient heating may be by a stepped gradation with variation thereon as set forth below.

BRIEF DESCRIPTION OF THE DRAWINGS

FIG. 2 is an elevational broadside view of a deicer mounted upon the leading edge of a propeller blade constructed in accordance with an embodiment of the invention.

FIG. 3 is a plan view of the electrical heating element without the supporting flexible rubber pad of a deicer.

FIG. 6 is an enlarged fragmentary view of the deicer pad on the leading edge similar to FIG. 2, with the deicer ribbon shown in dotted outline.

FIG. 7 is a cross section view of the deicer pad including flexible rubber pad and the heating element.

DETAILED DESCRIPTION

Figure 1:
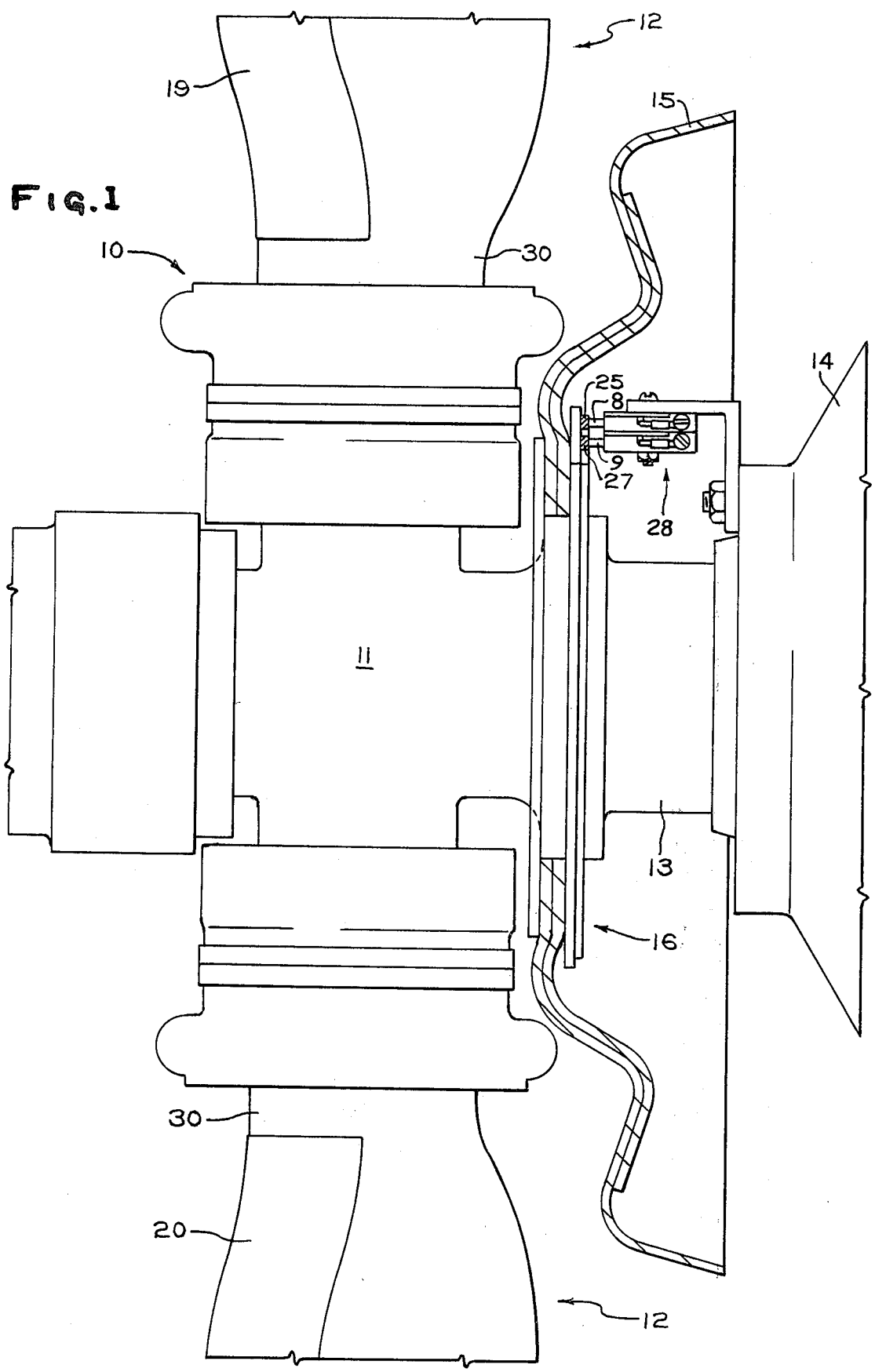
FIG. 1 is a fragmentary side elevational view, partly in section of a propeller assembly showing a deicer on the propeller blades.

Referring now to the drawings, wherein like reference characters designate like or corresponding parts throughout the several views, there is shown in FIG. 1 a propeller assembly designated generally as 10 having propeller blades 12 secured by suitable blade clamps to hub 11. The propeller blades 12 extend radially outwardly from an axis of rotation of the hub 11 which is driven by the shaft 13 from the engine. The engine for the drive shaft 13 being suitably mounted aft of the hub. Secured to the hub 11 and shaft 13 for rotation therewith are a spinner bulkhead 15 and a slip ring assembly 16, which slip ring assembly 16 makes contact with the brushes to be described to conduct an electric current via suitable straps and conductors to deicer boots 19 and 20 which are suitably mounted on the leading edges of the propeller blades.

The slip ring assembly 16, which rotates with the propeller blades 12, has an outer slip ring 25, and an inner slip ring 27 which slip rings are engageable with brushes 9, and 8 respectively contained in a brush block assembly designated 28. The brush block assembly 28 as shown in FIG. 1 contains two brushes abuttingly contacting two slip rings.

The propeller blade 12 has a shank portion 30, which is secured to the hub 11, a blade portion 31, with a trailing edge 32 and a leading edge 33, and a tip 34. Along and around the leading edge 33 of the blade 12 is secured the deicer pads 19 and 20 having a pair of electrical leadwires 35 and 36 leading to the slip rings. Since the construction of the deicer pads are similar, only deicer pad 19 will be described. Deicer pad 19 has an electrically heated element consisting of a metal ribbon 40 and 42 to be hereinafter described extends the full length of the pad in a zig-zag design as depicted by FIG. 3. The heating element (ribbons 40 and 42) is depicted as element 7 (the element is enlarged considerably for clarity) in FIG. 7. The heating element 7 is embedded in or enveloped within a covering or sandwiched between layers of electrically insulating or electrically non-conductive material 6 such as rubber or rubber reinforced dielectric material, which materials are old and well known in the art. Deicer pad 19 consists of a metal heating element that has a zig-zag design extending from one end or the inboard end which is located adjacent to the shank portion of the propeller blade 12 toward the tip end of the propeller blade 12, which is the outboard end of the deicer and thence back to inboard end of the deicer and the shank portion of the propeller blade 12. Described more specifically, the deicer heating element consists of plurality of transversely extending ribbons 40 and 42. The ribbons 40 are designated as 40a through 40z comprising a first set of ribbons with the respective adjacent one end connected together by bridging portions 41 while the ribbons 42 are designated 42a through 42y comprising a second set of ribbons with the respective adjacent one ends connected together by bridging portions 44. These respective ribbons are U-shaped and have the second set of ribbons nestled by the first set of ribbons. Such U-shaped ribbons have leg portions and the bridging portions with the other ends of adjacent leg portions of the respective first and second sets interconnected by bridging portions 43 and 45 respectively. The number of ribbons may be varied which accordingly will determine where the last of the two respective set of ribbons are interconnected at the outboard end. In the example shown the last heating ribbon 40z of the first set is connected to the last heating ribbon 42y of the second set by a bridging ribbon 46. This pattern is a zig-zag pattern providing a series resistance circuit. The heating ribbons 42a and 40a are located at the shank end of the propeller blade while the ribbons 42y and 40z are located away from the shank portion of the propeller blade and is referred to as the outboard end or tip of the deicer. The deicer heating ribbons 42a has a width (as shown in FIG. 3) "A" which is smaller than the width "B" of heating segment 40a. The respective widths of the heating ribbons get progressively larger as one proceeds from the inboard end to the outboard end or tip of the deicer. Thus the width of heating ribbon 42y is much larger than the width of heating ribbon 42a. As an example of the width C of heating ribbon 42y is approximately 62% greater than the width A of heating ribbon 42a. As one example of the gradient found effective is a deicer element having a power density of approximately 7 watts per square inch at the inboard end to 2 watts per square inch at the outboard end.

Figure 4:
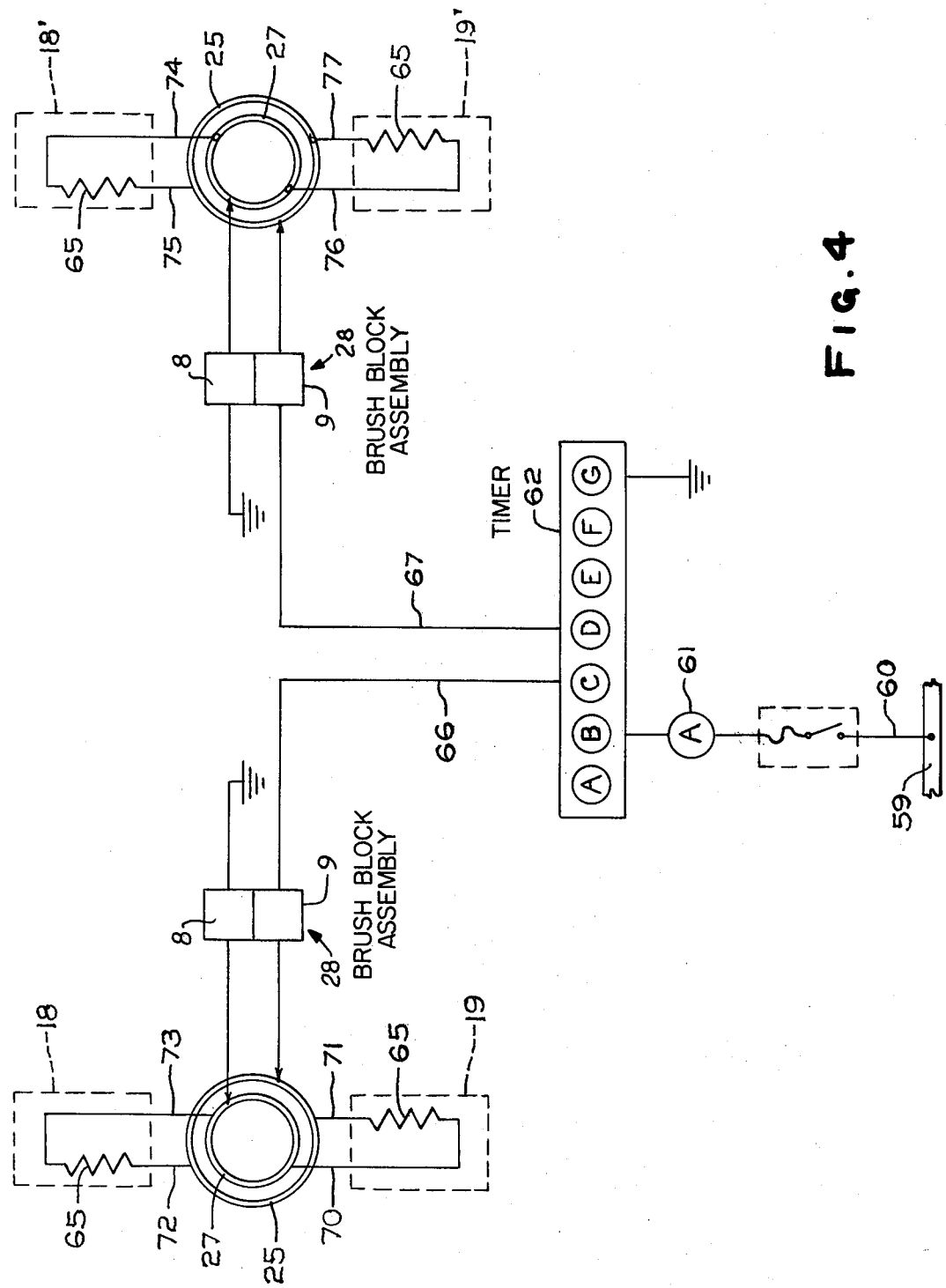
FIG. 4 is a schematic diagram illustrating the electrical circuit for the propeller deicer.

The operation of the described embodiment is shown schematically in FIG. 4. Direct current electrical power is supplied to the deicers 18 and 19 and 18'-19' shown schematically in FIG. 4, which depicts dual propellers from a suitable source via conductor 60 from a bus bar 59. Although FIG. 4 discloses two engines with four propeller blades, the invention is equally applicable to any combination of propeller blades and engines. An ammeter 61 is mounted in series between the power source and a timer 62. Each deicer 18-19-18'-19' is shown schematically as having an equivalent resistance which is designated 65 for the purpose of this explanation with it being understood that the equivalent resistance 65 is composed of ribbons 40a through 40z through 42y with the respective bridging portions. The output from timer 62 is directed via conductors 66 and 67 to brush block assemblies designated 28 which maintain contact with the slip rings 25 and 27 of slip ring assembly 16 which in turn provide an electric current via suitable straps and conductors which are designated as 70, 71, 72, 73, 74, 75, 76 and 77 to the respective deicers 19, 18, 18' and 19'. FIG. 3 shows conductors 70 and 71 as conducting current to ribbons 40a and 42a whose widths are substantially identical and as described above, the widths of the heating elements increase in the direction of the tip of the deicer which contains the heating ribbons 40z and 42y. With such increases in widths, the power density is greatest at the shank of the deicer with the greatest heating being at shank end or inboard end of the deicer since the resistance is greatest at the inboard end. This gradation of the power density is taken into consideration with the centrifugal force of a rotating propeller blade. Since the centrifugal force on a given ice mass in different portions of the blade vary, the tapered power density of the deicer complements the progressive increase in force and thus effectively maintains the propeller blade free from ice with a corresponding reduction in power requirement. This is particularly significant since the supply of power to aircraft using propellers are limited. It is to be understood that there are other factors that enter into the determination of power gradation such as the convection effect of air currents flowing over the blade.

In describing the deicer, reference was made to ribbons 42a through 42y and 40a through 40z in order to emphasize the gradual increase in width of the elements. In practice and as described these elements when so connected as described form a single continuous heating element.

Figure 5:
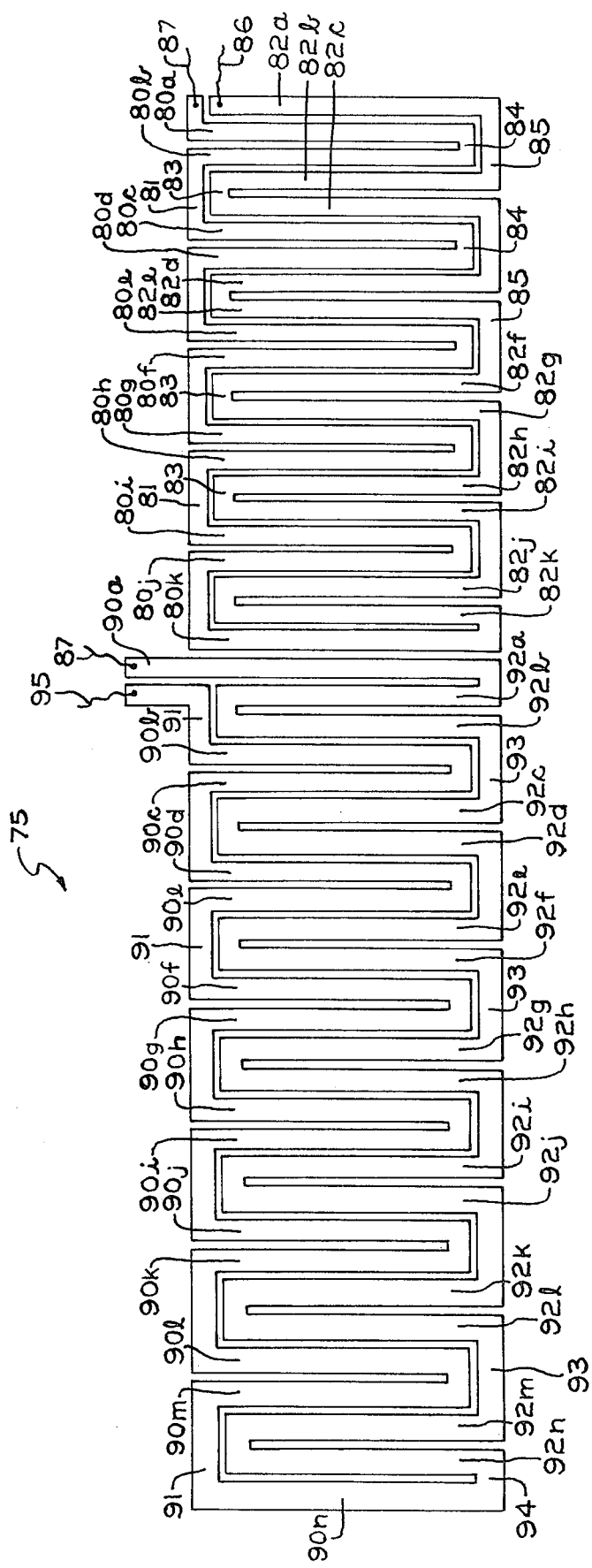
FIG. 5 is a plan view of a modified form of an electrical heating element without the supporting flexible rubber pad of a deicer.

A modification of the described embodiment is shown in FIG. 5 wherein a deicer 75 is shown similar in substantial respects to the deicer described in FIG. 3. Deicer 75 has a plurality of transversely extending heating ribbons 80a through 80k joined by bridging ribbons 81 forming a first set of ribbons which nestle a plurality transversely extending second set of heating ribbons 82a through 82k joined by bridging ribbons 83. As described in the first embodiment, such U-shaped heating ribbons have leg portions and bridging portions with the other end of adjacents by portions of the respective first and second set interconnected by bridging portions 84 and 85. The number of ribbons may be varied which will determine where the last of the two respective set of ribbons are interconnected at the outboard ends. In this example the path of the electric current to ribbon 82a is provided by a lead wire 86 and will proceed up the respective leg portions and bridging portions from 82a to 82c all the way to 82k thence from 80k to 80a and out lead wire 87. In addition to ribbon 80 and 82, the outboard portions of deicer 75 has a plurality of transversely extending heating ribbons 90a through 90n comprising a third set of ribbons. The ribbons 90a through 90n are joined by bridging ribbons 91 except for ribbon 90a which has connected to it a lead wire 87 (ground) which in turn can be connected to lead wire 87 of the first set of ribbons described immediately above. Ribbon 90a through 90n nestle a plurality of transversely extending fourth set of heating ribbons 92a through 92n. Heating ribbons 92b through 92n are joined by bridging ribbons 93 while 92n is connected to 90n by bridging ribbon 94. Ribbon 92a is connected to 90a and thence to lead wire 87 while bridging ribbon 91 is connected to a lead wire 95. The described embodiment is a dual element deicer wherein the first and second set of ribbons receive ½ of the power supply while the third and fourth set of ribbons receive the other ½ of the power supply as described and compared to the first embodiment. As in the first described embodiment, the ribbons provide a tapered power density with the greatest power density being greatest at 82a and the smallest at 90n. The advantage of having the dual element is to permit the reduction of power consumption by having the first dual element (first set and second set of ribbons) receive power first and thence have the second dual element (third set and fourth set of ribbons) receive power while the first element does not receive power. This is accomplished as described in FIG. 4 with the use of the timer 62 via the conductor, brush blocks and slip rings.

Although this modification has been described as a dual heating tapered power density, the tapered powered density is also applicable to any numbered groups as ten for example where the deicer has stepped increases from the inboard end in stepped increments.

A further modification of the desired invention may be made to FIG. 3 by having the tapered power density stepped rather than gradual. This is electrical heating ribbons 40a and 40b along with 42a and 42b are of the same dimensions in width and have the same heating capacity, followed by the next four segments (40c, 40d, 42c and 42d) having the same heating capacity in each ribbon but less than the first group. The next set would then be 40e, 40f, 42e and 42f followed by 40g, 40h, 42g and 42h, followed by the next four ribbons. This is progressively followed to incrementally decrease the heating power density until the outboard end is reached which group of ribbons have the smallest power density. Thus, the difference being that the power density is greatest at the inboard end of the deicer and decreases in incremental steps towards the outboard end of the deicer.

Various modifications are contemplated and may obviously be resorted to by those skilled in the art without departing from the described invention as hereinafter defined by the appended claims, as only a preferred embodiment thereof has been disclosed.

We claim:

1. An electrically heated propeller deicer pad for a propeller blade with a shank end and an outboard end, said deicer pad comprising a generally flexible sheet of electrically non-conductive material for mounting upon the leading edge of the propeller blade with one end of said deicer pad defining a deicer shank end at the shank end of the propeller blade and the other end of said deicer pad extending on said blade in a direction away from said shank end toward the outboard end of said propeller blade defining a deicer outboard end, said deicer pad having a pair of laterally spaced side edges interconnecting said one end with said deicer outboard end, an electrically conductive heating element being the sole means for deicing located within said deicer flexible sheet material, said heating element extending as a continuous electrically conductive heating element across said leading edge and laterally toward said side edges of said deicer pad back and forth for the full length of said deicer pad, electrical power input means connected to said heating element at said shank end, and said heating element having a gradient power density extending from said one end to said other end of said deicer pad with the greatest power density being at said shank end.

2. An electrically heated propeller deicer as set forth in claim 1 wherein said heating element comprises a continuous ribbon element that zig-zags back and forth laterally across said flexible sheet from one of said side edges to the other one of said side edges; and said continuous conductor element increases in cross-sectional area in the direction of said outboard end to provide a tapered power density from said one end to said other end of said deicer pad.

3. An electrically heated propeller deicer as set forth in claim 2 wherein said continuous ribbon conductor element has electrical insulation means between said zig-zag path to maintain the conductive flow of current in said zig-zag path on said ribbon conductor element.

4. An electrically heated propeller deicer for use on a propeller blade having a shank end and an outboard end; said deicer consisting of a flexible sheet of electrically non-conductive material with an inboard end, an outboard end and laterally spaced side edges interconnecting said inboard end and said outboard end; said deicer mounted upon the leading edge of the propeller blade with the inboard end of said deicer at the shank end of the propeller blade and the outboard end of said deicer extending on said blade in a direction away from said shank end toward the outboard end of said propeller blade, a plurality of heating elements embedded within said flexible sheet; said heating elements being the sole deicing means within said deicer; said elements located along the length of said deicer and extending outwardly adjacent to said side edges; electrical power input means connected to said heating elements; each of said heating elements interconnected to form a continuous flow path from said inboard end to said outboard end of said deicer and from said outboard end of said deicer to said inboared end; and said heating elements in combination having a stepped gradient power density that extends from said inboard end to said outboard end with the greatest power density at said inboard end.

5. An electrically heated propeller deicer as set forth in claim 4 wherein each of said heating elements comprises a group of heating ribbons, the ribbons in each group having the same power density, each group of ribbons in aligned order providing a decreasing power density in the direction of said outboard end to provide said stepped gradient power density.

6. An electrically heated propeller deicer as set forth in claim 5 wherein said group of ribbons form a continuous conductor that extends from said inboard end to said outboard end and back to said inboard end.

7. An electrically heated propeller deicer for a propeller blade with a shank end and an outboard end, said deicer generally consisting of a flexible sheet of electrically non-conductive material for mounting upon the leading edge of the propeller blade, said deicer having an inboard end and an outboard end, said deicer mounted on said blade with the inboard end of said deicer at the shank end of the propeller blade and the outboard end of said deicer extending on said blade in a direction away from said shank end toward the outboard end of said propeller blade, a pair of electrically conductive heating elements located within said flexible sheet and extending from said inboard end to said outboard end of said deicer, said electrically conductive heating elements extending transversely across said flexible sheet from adjacent one side edge to adjacent the other side edge, one of said pair of elements located adjacent to said inbord end and the other of said pair of elements located toward the outboard end of said deicer, electrical power input means connected to each of said heating elements, said heating elements providing a gradient power density extending from said inboard end to said outboard end with the greatest power density at said inboard end.

8. An electrically heated propeller deicer as set forth in claim 7 wherein said heating elements are energized for deicing in seriatim order.

9. An electrically heated propeller deicer for a propeller blade with a shank end and an outboard end, said deicer consisting of a generally flat longitudinally extending flexible sheet of electrically nonconductive material for mounting on said blade with the intermediate portion of said deicer located on the leading edge of a propeller blade, said longitudinally extending deicer having an inboard end and an outboard end, said inboard end of said deicer located at said shank end of said propeller blade and said outboard end of said deicer extending on said blade in a direction away from said shank end toward said outboard end of said propeller blade, a plurality of heating ribbons located within said flexible sheet, said ribbons being grouped in seriatim order along the length of said deicer to provide a plurality of heating elements, each of said heating elements decreasing in power density from said inboard end to said outboard end to provide a stepped power density in said deicer that is greatest at said inboard end of said deicer, and electrical power input means connected to said heating elements only along said inboard ends to energize said heating elements.

10. An electrically heated propeller deicer as set forth in claim 9 wherein said heating ribbons form a continuous conductor element that zig-zags back and forth laterally across said flexible sheet to provide a linear power density in a transverse direction across said deicer.

11. An electrical deicing pad for the leading edge of a propeller blade consisting of a flexible sheet of electrically non-conductive material secured to said propeller blade, said propeller blade having a hub and an end, said sheet being a longitudinally extending member with lateral side edges and ends, a plurality of resistance strips in insulated relation to one another connected in series in said pad, said strips extending generally transversely across said sheet and interconnected at the lateral side edges thereof to provide said series connection, one end of said sheet terminating closely adjacent to said hub of said propeller blade and the other end of said elongated sheet being spaced from said hub of said propeller blade and extending toward said end of said propeller blade, and the strips being of lesser resistance to the conductivity of current progressively away from said one end of said elongated sheet to provide a tapered power density to said deicer that has the greatest power density at said one end adjacent said hub.

12. An electrical deicing pad as set forth in claim 11, wherein said strips are grouped so that all of said strips in each group contains the same resistance, all of said groups are connected in series and each group progressively further away from said hub being of lesser power density than the group adjacent thereto to provide said tapered power density.

13. An electrically heated propeller deicer for a propeller, said deicer being a longitudinally extending flexible sheet of electrically non-conductive material for mounting on a propeller blade, said deicer having an inboard end and an outboard end, heating means located within said flexible sheet being the sole deicing means, said heating means having a first set and a second set of U-shaped heating ribbons, each of said U-shaped ribbons having a pair of leg portions and a bridging portion, each bridging portion interconnects the respective one ends of said leg portions to form said U-shaped ribbons, each U-shaped ribbon in said second set being nestled by a U-shaped ribbon in said first set, the other end portion of said leg members of said first set are connected to adjacent other end portions of said leg members of said first set, the other end portion of said leg members of said second set are connected to adjacent other end portions of said leg members of said second set, the other end portion of said second set closest to said outboard end of said deicer being interconnected to the other end portion of said first set closest to outboard end of said deicer to form a continuous electrically conductive heating path that extends in a zig-zag path from said inboard end of said deicer toward said outboard end of said deicer and back to said inboard end of said deicer, electrical power input means connected to said heating ribbons, and said heating ribbons having a tapered power density from said inboard end to said outboard end along said electrically conductive heating path with the greatest power density being at said inboard end of said deicer.

14. An electrically heated propeller deicer pad for a propeller blade with a shank end and a tip end, said deicer pad being a longitudinally extending flexible sheet of electrically non-conductive material for mounting on a propeller blade, said deicer pad having an inboard end and an outbord end, said inboard end of said deicer located at said shank end of said propeller blade and said outboard end of said deicer pad extending on said blade in a direction away from said shank end towards said tip end of said propeller blade, electrically conductive heating means located within said flexible sheet, said heating means being the sole deicing means for said deicer pad, said heating means being a continuous heating ribbon that extends in a zig-zag direction from said inboard end of said deicer towards said outboard end of said deicer pad and back to said inboard end of said deicer pad, electrical power input means connected to said heating ribbon at said inboard end, and said heating ribbon having a gradient electrical resistance from said inboard end to said outboard and back to said inboard end to provide a gradient power density wherein the greatest power density is at said inboard end of said deicer.

15. An electrically heated deicer pad as set forth in claim 14 wherein said continuous electrically conductive heating ribbon increases in cross sectional area progressively from said inboard end to said outboard end.

16. An electrically heated deicer pad as set forth in claim 14 wherein said heating ribbon increases in power density in stepped increments.

* * * * *

REEXAMINATION CERTIFICATE (2667th)

United States Patent [19]

Sweet et al.

[11] B1 4,386,749

[45] Certificate Issued  Sep. 12, 1995

[54] PROPELLER DEICER

[75] Inventors: David B. Sweet, Akron, Ohio; Wayne E. Hoffman, Richwood, W. Va.

[73] Assignee: The B. F. Goodrich Company, New York, N.Y.

Reexamination Request:
No. 90/003,554, Aug. 25, 1994

Reexamination Certificate for:
Patent No.: 4,386,749
Issued: Jun. 7, 1983
Appl. No.: 914,636
Filed: Jun. 12, 1978

Certificate of Correction issued Mar. 4, 1986.

Related U.S. Application Data

[63] Continuation-in-part of Ser. No. 774,576, Mar. 4, 1977, abandoned.

[51] Int. Cl.$^6$ .............................................. B64D 15/12
[52] U.S. Cl. .............................................. 244/134 D
[58] Field of Search ...................... 244/134 R, 134 D; 219/201, 202, 528, 537, 549, 552; 416/553, 95

[56] References Cited

U.S. PATENT DOCUMENTS

| | | |
|---|---|---|
| 2,406,367 | 9/1946 | Griffith et al. |
| 2,487,658 | 4/1949 | LaRue |
| 2,552,075 | 6/1951 | Van Daam |
| 2,564,325 | 6/1951 | Coonly |
| 2,757,273 | 2/1956 | Taylor |
| 3,657,514 | 11/1972 | Adams |
| 3,781,526 | 12/1973 | Damron |

OTHER PUBLICATIONS

*Thomas Register*, Feb., 1976, MINCO Advertisement.
Werner, J. B. @ Lockheed–California Company, Nov., 1975 *The Development of an Advanced Anti-Icing/Deicing Capability for U.S. Army Helicopters*, vol. II, pp. 21–23.

*Primary Examiner*—Galen Barefoot

[57] ABSTRACT

A deicer for use on the propeller of an aircraft wherein the heating elements or elements of the deicer which are embedded in an electrically non-conductive material adhered to a propeller blade provide a gradient type of heat distribution pattern having the greatest heat concentration at the area of the propeller closer to the shank end and a lower heat concentration at the area of the propeller further away from the shank end.

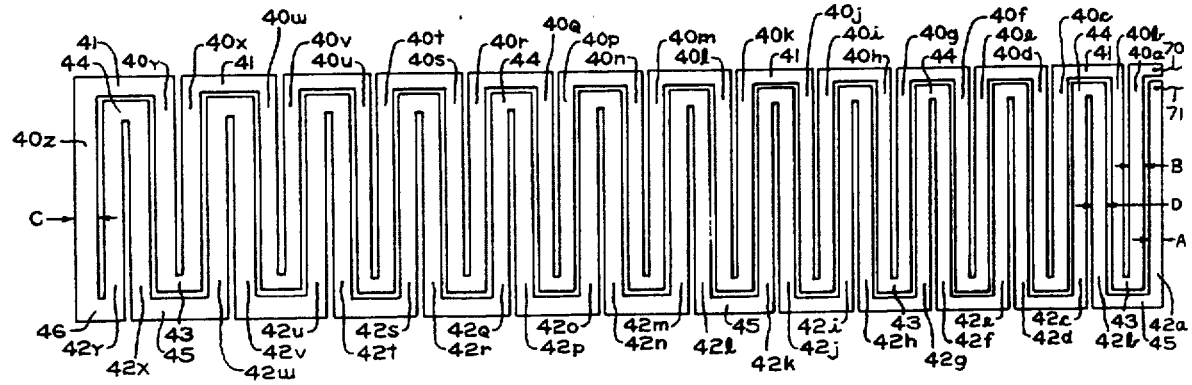

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 1–6:

In describing the deicer, reference was made to ribbons 42a through 42y and 40a through 40z in order to emphasize the gradual increase in width of the elements. In practice and as described these elements when so connected as described form a single continuous heating element. *According to a preferred embodiment, the element is jointless.*

Column 4, lines 57–61:

*The greatest power density in each element is nearest the inboard end of each heating element, which corresponds to ribbons 82a and 90a of FIG. 5, since these ribbons are the narrowest ribbons in each heating element.* Although this modification has been described as a dual heating tapered power density, the tapered powered density is also applicable to any numbered groups as ten for example where the deicer has stepped increases from the inboard end in stepped increments.

AS A RESULT OF REEXAMINATION, IT HAS BEEN DETERMINED THAT:

Claims 1, 4, 7, 9, 11, 13 and 14 are determined to be patentable as amended.

Claims 2–3, 5–6, 8, 10, 12, 15, and 16, dependent on an amended claim are determined to be patentable.

New claims 17–22 are added and determined to be patentable.

1. An electrically heated propeller deicer pad for a propeller blade with a shank end and an outboard end, said deicer pad comprising a generally flexible sheet of electrically non-conductive material for mounting upon the leading edge of the propeller blade with one end of said deicer pad defining a deicer shank end at the shank end of the propeller blade and the other end of said deicer pad extending on said blade in a direction away from said shank end toward the outboard end of said propeller blade defining a deicer outboard end, said deicer pad having a pair of laterally spaced side edges interconnecting said one end with said deicer outboard end, an electrically conductive *metal* heating element being the sole means for deicing located within said deicer flexible sheet material, said heating element extending as a *series connected* continuous electrically conductive heating element across said leading edge and laterally toward said side edges of said deicer pad back and forth for the full length of said deicer pad, electrical power input means connected to said heating element at said shank end, and said heating element having a gradient power density extending from said one end to said other end of said deicer pad with the greatest power density being at said shank end.

4. An electrically heated propeller deicer for use on a propeller blade having a shank end and an outboard end; said deicer consisting of a flexible sheet of electrically non-conductive material with an inboard end, an outboard end and laterally spaced side edges interconnecting said inboard end and said outboard end; said deicer mounted upon the leading edge of the propeller blade with the inboard end of said deicer at the shank end of the propeller blade and the outboard end of said deicer extending on said blade in a direction away from said shank end toward the outboard end of said propeller blade, a plurality of *metal* heating elements embedded within said flexible sheet; said heating elements being the sole deicing means within said deicer; said elements located along the length of said deicer and extending outwardly adjacent to said side edges; electrical power input means connected to said heating elements; each of said heating elements interconnected *in series* to form a continuous flow path from said inboard end to said outboard end of said deicer and from said outboard end of said deicer to said inboared end; and said heating elements in combination having a stepped gradient power density that extends from said inboard end to said outboard end with the greatest power density at said inboard end.

7. An electrically heated propeller deicer for a propeller blade with a shank end and an outboard end, said deicer generally consisting of a flexible sheet of electrically non-conductive material for mounting upon the leading edge of the propeller blade, said deicer having an inboard end and an outboard end, said deicer mounted on said blade with the inboard end of said deicer at the shank end of the propeller blade and the outboard end of said deicer extending on said blade in a direction away from said shank end toward the outboard end of said propeller blade, a pair of electrically conductive *metal* heating elements located within said flexible sheet and extending from said inboard end to said outboard end of said deicer, said electrically conductive heating elements extending transversely across said flexible sheet from adjacent one side edge to adjacent the other side edge, one of said pair of elements located adjacent to said [inbord] *inboard* end and the other of said pair of elements located toward the outboard end of said deicer, electrical power input means connected to each of said heating elements, *each of* said heating elements *being comprised of a series connected continuous heating element* providing a gradient power density [extending from said inboard end to said outboard end] *within that element* with the greatest power density [at] *nearest* said inboard end.

9. An electrically heated propeller deicer for a propeller blade with a shank end and an outboard end, said deicer consisting of a generally flat longitudinally extending flexible sheet of electrically nonconductive material for mounting on said blade with the intermediate portion of said deicer located on the leading edge of a propeller blade, said longitudinally extending deicer having an inboard end and an outboard end, said inboard end of said deicer located at said shank end of said propeller blade and said outboard end of said deicer extending on said blade in a direction away from said shank end toward said outboard end of said propeller blade, a plurality of *metal* heating ribbons located within said flexible sheet, said ribbons being grouped in seriatim order along the length of said deicer to provide a plurality of heating elements, each of said heating elements *being comprised of a series connected continuous heating element* decreasing in power density from said inboard end to said outboard end to provide a stepped power density in said deicer that is greatest at said inboard end of said deicer, and electrical power input means connected to said heating elements only along said inboard ends to energize said heating elements.

11. An electrical deicing pad for the leading edge of a propeller blade consisting of a flexible sheet of electrically non-conductive material secured to said propeller blade, said propeller blade having a hub and an end, said sheet being a longitudinally extending member with lateral side edges and ends, a plurality of *metal* resistance strips in insulated relation to one another connected in series in said pad, said strips extending generally transversely across said sheet and interconnected at [the] *said* lateral side edges thereof to provide said series connection, one end of said sheet terminating closely adjacent to said hub of said propeller blade and the other end of said elongated sheet being spaced from said hub of said propeller blade and extending toward said end of said propeller blade, and the strips being of lesser resistance to the conductivity of current progressively away from said one end of said elongated sheet to provide a tapered power density to said deicer that has the greatest power density at said one end adjacent said hub.

13. An electrically heated propeller deicer for a propeller, said deicer being a longitudinally extending flexible sheet of electrically non-conductive material for mounting on a propeller blade, said deicer having an inboard end and an outboard end, heating means located within said flexible sheet being the sole deicing means, said heating means having a first set and a second set of *metal* U-shaped heating ribbons, each of said U-shaped ribbons having a pair of leg portions and a bridging portion, each bridging portion interconnects the respective one ends of said leg portions to form said U-shaped ribbons, each U-shaped ribbon in said second set being nestled by a U-shaped ribbon in said first set, the other end portion of said leg members of said first set are connected to adjacent other end portions of said leg members of said first set, the other end portion of said leg members of said second set are connected to adjacent other end portions of said leg members of said second set, the other end portion of said second set closest to said outboard end of said deicer being interconnected to the other end portion of said first set closest to *said* outboard end of said deicer to form a continuous *series connected* electrically conductive heating path that extends in a zig-zag path from said inboard end of said deicer toward said outboard end of said deicer and back to said inboard end of said deicer, electrical power input means connected to said heating ribbons, and said heating ribbons having a tapered power density from said inboard end to said outboard end along said electrically conductive heating path with the greatest power density being at said inboard end of said deicer.

14. An electrically heated propeller deicer pad for a propeller blade with a shank end and a tip end, said deicer pad being a longitudinally extending flexible sheet of electrically non-conductive material for mounting on a propeller blade, said deicer pad having an inboard end and an outboard end, said inboard end of said deicer located at said shank end of said propeller blade and said outboard end of said deicer pad extending on said blade in a direction away from said shank end towards said tip end of said propeller blade, electrically conductive heating means located within said flexible sheet, said heating means being the sole deicing means for said deicer pad, said heating means being a continuous *metal* heating ribbon that extends in a zig-zag direction from said inboard end of said deicer towards said outboard end of said deicer pad and back to said inboard end of said deicer pad, electrical power input means connected to said heating ribbon at said inboard end, and said heating ribbon having a gradient *series* electrical resistance from said inboard end to said outboard and back to said inboard end to provide a gradient power density wherein the greatest power density is at said inboard end of said deicer.

17. An electrically heated propeller deicer pad for a propeller blade with a shank end and an outboard end, said deicer pad comprising:

a generally flexible sheet of electrically non-conductive material for mounting upon the leading edge of the propeller blade with one end of said deicer pad defining a deicer shank end at the shank end of the propeller blade and the other end of said deicer pad extending on said blade in a direction away from said shank end toward the outboard end of said propeller blade defining a deicer outboard end, said deicer pad having a pair of laterally spaced side edges interconnecting said one end with said deicer outboard end;

an electrically conductive ribbon heating element being the sole means for deicing located within said deicer flexible sheet material, said heating element extending as a series connected continuous electrically conductive heating element across said leading edge and laterally toward said side edges of said deicer pad back and forth for the full length of said deicer pad, electrical power input means connected to said heating element at said shank end, and said ribbon heating element decreasing in resistance with distance from said deicer shank end by increasing ribbon width thereby providing a gradient power density extending from said one end to said other end of said deicer pad with the greatest power density being at said shank end.

18. An electrically heated propeller deicer pad for a propeller blade with a shank end and an outboard end, comprising:

a rubber layer of electrically non-conductive material for mounting upon the leading edge of the propeller blade with one end of said rubber layer defining a deicer inboard end at the shank end of the propeller blade and the other end of said rubber layer extending on said blade in a direction away from said deicer inboard end toward the tip of said propeller blade and defining a deicer outboard end, said rubber layer having a pair of laterally spaced side edges interconnecting said deicer inboard end with said deicer outboard end;

a metal heating element being the sole means for deicing located within said rubber layer, said heating element comprising a multitude of transversely extending ribbons interconnected in series to form a zig-zag path from said deicer inboard end to said deicer outboard end and back to said deicer inboard end, said ribbons decreasing in resistance with distance from said deicer inboard end to provide a gradient power density extending from said deicer inboard end to said deicer outboard end with the greatest power density being at said deicer inboard end.

19. The deicer pad of claim 18 wherein said metal heating element is jointless.

20. The deicer pad of claim 18, wherein said ribbons decrease in resistance by increasing ribbon width.

21. The deicer pad of claim 18 wherein said ribbons comprise a first set and a second set of U-shaped ribbons, each of said U-shaped ribbons having a pair of leg portions and a bridging portion, each bridging portion interconnecting the respective one ends of said leg portions to form said U-shaped ribbons, each U-shaped ribbon in said second set being nestled by a U-shaped ribbon in said first set, the other end portion of said leg members of said first set are connected to adjacent other end portions of said leg members of said first set, the other end portion of said leg members of said second set are connected to adjacent other end portions of said leg members of said second set, the other end portion of said second set closest to said outboard end being interconnected to the other end portion of said first set closest to said outboard end.

22. An electrically heated propeller deicer pad for a propeller blade with a shank end and an outboard end, comprising:

a rubber layer of electrically non-conductive material for mounting upon the leading edge of the propeller blade with one end of said rubber layer defining a deicer inboard end at the shank end of the propeller blade and the other end of said rubber layer extending on said blade in a direction away from said deicer inboard toward the tip of said propeller blade and defining a deicer outboard end, said rubber layer having a pair of laterally spaced side edges interconnecting said deicer inboard end with said deicer outboard end;

a jointless metal heating element being the sole means for deicing located within said rubber layer, said heating element comprising a first set and a second set of transversely extending U-shaped ribbons, each of said U-shaped ribbons having a pair of leg portions, and a bridging portion connecting the respective one ends of said leg portions to form said U-shaped ribbons, each U-shaped ribbon in said second set being nestled by a U-shaped ribbon in said first set, the other end portion of said leg members of said first set are connected to adjacent other end portions of said leg members of said first set, the other end portion of said leg members of said second set are connected to adjacent other end portions of said leg members of said second set, the other end portion of said second set closest to said deicer outboard end being interconnected to the other end portion of said first set closest to said deicer outboard end, said U-shaped ribbons thereby being interconnected in series to form a single zig-zag path from said deicer inboard end to said deicer outboard end and back to said deicer inboard end, said ribbons decreasing in resistance with distance from said deicer inboard end by increasing ribbon width, said heating element thereby having a gradient power density extending from deicer inboard end to said deicer outboard end with the greatest power density being at said deicer inboard end.

* * * * *